(12) United States Patent
Saliba

(10) Patent No.: US 8,682,779 B2
(45) Date of Patent: *Mar. 25, 2014

(54) METHOD AND APPARATUS FOR PRICE IMPROVEMENT, PARTICIPATION, AND INTERNALIZATION

(75) Inventor: Anthony J. Saliba, Chicago, IL (US)

(73) Assignee: LiquidPoint, LLC, Chicago, IL (US)

(*) Notice: Subject to any disclaimer, the term of this patent is extended or adjusted under 35 U.S.C. 154(b) by 43 days.

This patent is subject to a terminal disclaimer.

(21) Appl. No.: 13/473,775

(22) Filed: May 17, 2012

(65) Prior Publication Data

US 2012/0233055 A1 Sep. 13, 2012

Related U.S. Application Data

(63) Continuation of application No. 13/181,183, filed on Jul. 12, 2011, now abandoned, and a continuation of application No. 13/038,253, filed on Mar. 1, 2011, now Pat. No. 8,055,577, and a continuation of application No. 12/062,348, filed on Apr. 3, 2008, now Pat. No. 7,912,779, and a continuation of application No. 10/786,196, filed on Feb. 25, 2004, now Pat. No. 7,392,218, and a continuation of application No. 09/621,769, filed on Jul. 21, 2000, now Pat. No. 6,829,589.

(51) Int. Cl.
*G06Q 40/04* (2012.01)

(52) U.S. Cl.
USPC .............................. 705/37; 705/35

(58) Field of Classification Search
CPC .................................................. G06Q 40/04
USPC ...................................................... 705/35, 37
See application file for complete search history.

(56) References Cited

U.S. PATENT DOCUMENTS

| | | | |
|---|---|---|---|
| 4,674,044 | A | 6/1987 | Kalmus |
| 5,038,284 | A | 8/1991 | Kramer |
| 5,077,665 | A | 12/1991 | Silverman |
| 5,101,353 | A | 3/1992 | Lupien |

(Continued)

FOREIGN PATENT DOCUMENTS

| | | |
|---|---|---|
| BE | 902761 | 10/1985 |
| DK | 0625275 | 10/1997 |

(Continued)

OTHER PUBLICATIONS

Investment Dealers' Digest "Schwab inks deal with Cincinnati to trade NYSE stocks" Sep. 6, 1999.

(Continued)

*Primary Examiner* — Jagdish Patel
(74) *Attorney, Agent, or Firm* — Joseph M. Butscher; The Small Patent Law Group, LLC

(57) ABSTRACT

A method for stock option trading includes receiving an option order at a market, contemporaneously receiving a copy of the option order at an electronic drop (EDrop) system, which is separate and distinct from the market, obtaining a potential cross quantity and a potential cross price based on the option order at the EDrop system, and submitting, through the EDrop system, a contra-order, with respect to the option order, to the market for fulfillment, wherein the contra-order specifies at least one of an underlying security potential cross quantity, and the potential cross price.

120 Claims, 3 Drawing Sheets

(56) References Cited

U.S. PATENT DOCUMENTS

| | | |
|---|---|---|
| 5,136,501 A | 8/1992 | Silverman |
| 5,168,446 A | 12/1992 | Wiseman |
| 5,270,922 A | 12/1993 | Higgins |
| 5,297,031 A | 3/1994 | Gutterman |
| 5,297,032 A | 3/1994 | Trojan |
| 5,305,200 A | 4/1994 | Hartheimer |
| 5,375,055 A | 12/1994 | Togher |
| 5,463,547 A | 10/1995 | Markowitz |
| 5,689,652 A | 11/1997 | Lupien |
| 5,724,524 A | 3/1998 | Hunt |
| 5,727,165 A | 3/1998 | Ordish |
| 5,758,328 A | 5/1998 | Giovannoli |
| 5,774,877 A | 6/1998 | Patterson |
| 5,793,301 A | 8/1998 | Patterson |
| 5,809,483 A | 9/1998 | Broka |
| 5,884,286 A | 3/1999 | Daughtery |
| 5,915,245 A | 6/1999 | Patterson |
| 5,950,176 A | 9/1999 | Keiser |
| 6,016,483 A | 1/2000 | Rickard |
| 6,061,663 A | 5/2000 | Bloom |
| 6,195,647 B1 | 2/2001 | Martyn |
| 6,321,212 B1 | 11/2001 | Lange |
| 6,360,246 B1 | 3/2002 | Begley |
| 6,377,940 B2 | 4/2002 | Tilfors |
| 6,405,180 B2 | 6/2002 | Tilfors |
| 6,493,682 B1 | 12/2002 | Horrigan |
| 6,539,362 B1 | 3/2003 | Patterson |
| 6,618,707 B1 | 9/2003 | Gary |
| 6,766,304 B2 | 7/2004 | Kemp |
| 6,772,132 B1 | 8/2004 | Kemp |
| 6,938,011 B1 | 8/2005 | Kemp |
| 6,941,280 B1 | 9/2005 | Gastineau |
| 6,993,504 B1 | 1/2006 | Friesen |
| 7,082,398 B1 | 7/2006 | Apple |
| 7,082,410 B1 | 7/2006 | Anaya |
| 7,099,838 B1 | 8/2006 | Gastineau |
| 7,181,424 B1 | 2/2007 | Ketchum |
| 7,181,425 B1 | 2/2007 | Cha |
| 7,209,896 B1 | 4/2007 | Serkin |
| 7,212,999 B2 | 5/2007 | Friesen |
| 7,222,096 B2 | 5/2007 | Anaya |
| 7,246,092 B1 | 7/2007 | Peterson |
| 7,246,093 B1 | 7/2007 | Katz |
| 7,249,091 B2 | 7/2007 | Kinney |
| 7,356,498 B2 | 4/2008 | Kaminsky |
| 7,356,500 B1 | 4/2008 | Waelbroeck |
| 7,406,444 B2 | 7/2008 | Eng |
| 7,454,372 B1 | 11/2008 | Anaya |
| 7,533,052 B2 | 5/2009 | Tilfors |
| 7,599,875 B1 | 10/2009 | Ketchum |
| 7,716,119 B2 | 5/2010 | Cha |
| 7,747,512 B2 | 6/2010 | Gastineau |
| 7,778,842 B2 | 8/2010 | Apple |
| 7,801,795 B2 | 9/2010 | Nunes |
| 7,814,001 B2 | 10/2010 | Weber |
| 7,822,678 B2 | 10/2010 | Weber |
| 7,870,056 B2 | 1/2011 | Ketchum |
| 7,885,882 B1 | 2/2011 | Brander |
| 7,917,429 B2 | 3/2011 | Weber |
| 7,970,687 B2 | 6/2011 | Gastineau |
| 7,980,457 B2 | 7/2011 | Kaminsky |
| 8,024,258 B2 | 9/2011 | Gastineau |
| 8,027,911 B2 | 9/2011 | Weber |
| 2001/0003179 A1 | 6/2001 | Martyn |
| 2002/0073016 A1 | 6/2002 | Furbush |
| 2002/0133449 A1 | 9/2002 | Segal |
| 2002/0138299 A1 | 9/2002 | Nations |
| 2002/0161687 A1 | 10/2002 | Serkin |
| 2002/0194115 A1 | 12/2002 | Nordlicht |
| 2003/0023542 A1 | 1/2003 | Kemp |
| 2003/0040955 A1 | 2/2003 | Anaya |
| 2003/0046035 A1 | 3/2003 | Anaya |
| 2003/0050888 A1 | 3/2003 | Satow |
| 2003/0055768 A1 | 3/2003 | Anaya |
| 2003/0093343 A1 | 5/2003 | Huttenlocher |
| 2003/0177086 A1 | 9/2003 | Gomber |
| 2004/0024690 A1 | 2/2004 | Satow |
| 2004/0024691 A1 | 2/2004 | Satow |
| 2004/0030634 A1 | 2/2004 | Satow |
| 2004/0186803 A1 | 9/2004 | Weber |
| 2008/0288390 A1 | 11/2008 | Maynard |
| 2011/0246351 A1 | 10/2011 | Sulavka |

FOREIGN PATENT DOCUMENTS

| | | |
|---|---|---|
| DK | 1319211 | 8/2005 |
| EP | 0 401 203 | 12/1990 |
| EP | 0 411 748 | 2/1991 |
| EP | 0 434 224 | 6/1991 |
| EP | 0 752 135 | 2/1999 |
| EP | 1 081 614 | 3/2001 |
| EP | 1 321 870 | 6/2003 |
| EP | 1 870 851 | 12/2007 |
| EP | 2 000 971 | 12/2008 |
| EP | 2 278547 | 1/2011 |
| GB | 2375405 | * 11/2002 |
| NO | 974926 | 12/1997 |
| NO | 991346 | 5/1999 |
| NO | 20012875 | 8/2001 |
| NO | 20060090 | 8/2001 |
| NO | 20014030 | 10/2001 |
| WO | WO 9428496 | 12/1994 |
| WO | WO 9605566 | 2/1996 |
| WO | WO 9618160 | 6/1996 |
| WO | WO 9634357 | 10/1996 |
| WO | WO 9730407 | 8/1997 |
| WO | WO 9812659 | 3/1998 |
| WO | WO 9821667 | 5/1998 |
| WO | WO 9826363 | 6/1998 |
| WO | WO 9927477 | 6/1999 |
| WO | WO 0011587 | 3/2000 |
| WO | WO 0113196 | 2/2001 |
| WO | WO 0150317 | 7/2001 |
| WO | WO 2004104791 | 12/2004 |
| WO | WO 2005098710 | 10/2005 |
| WO | WO 2010077376 | 7/2010 |

OTHER PUBLICATIONS

Walker, Joseph A., "How the Options Markets Work," 1991, Chapter 6, Equity Options Strategies.

"Autocorrelated Returns and Optimal Intertemporal Portfolio Choice," Blavers, Ronald J., Management Science, Nov. 1997, 32, 11; ABI/INFORM Global.

* cited by examiner

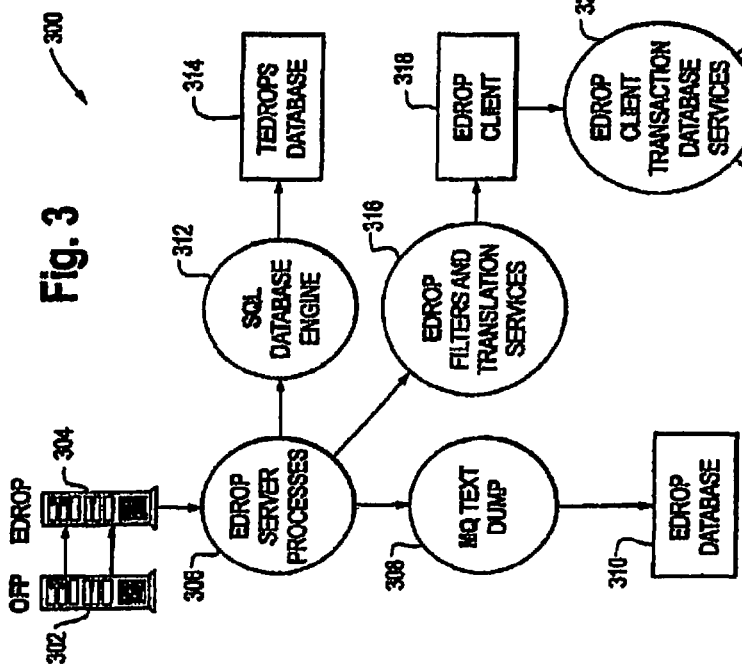
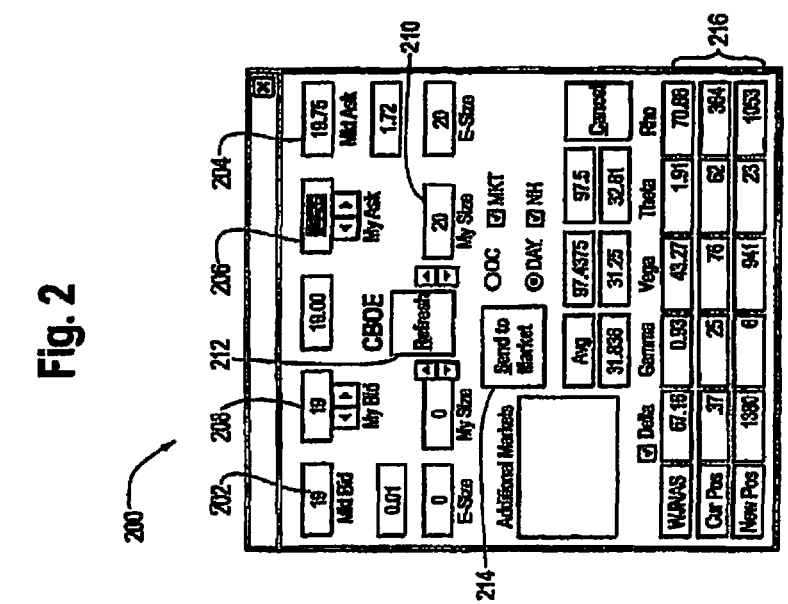

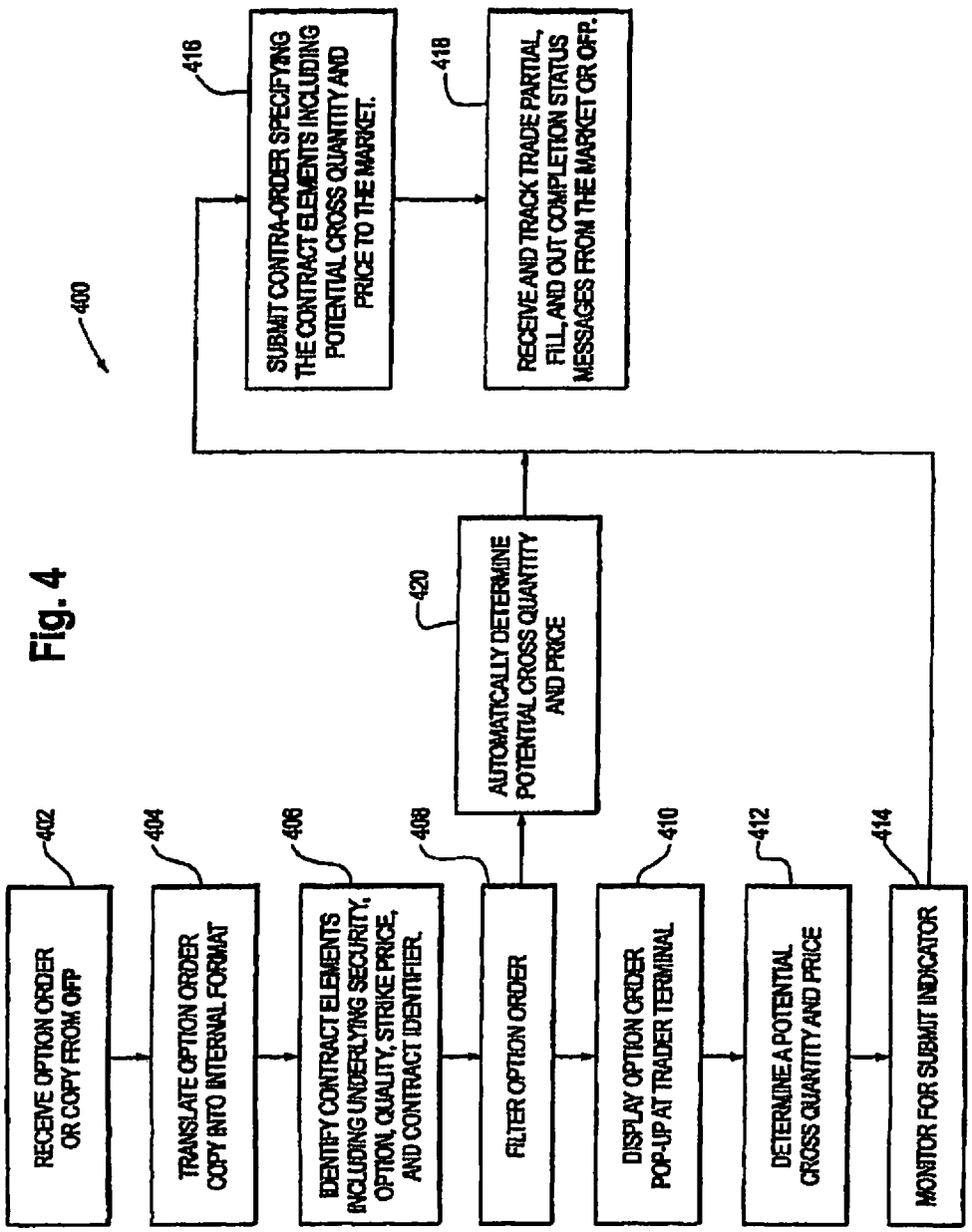

METHOD AND APPARATUS FOR PRICE IMPROVEMENT, PARTICIPATION, AND INTERNALIZATION

This application is a continuation of pending application Ser. No. 13/181,183, entitled "Method and Apparatus for Price Improvement, Participation, and Internalization," filed Jul. 12, 2011, which is in turn a continuation of Ser. No. 13/038,253, entitled "Method and Apparatus for Stock and Index Option Price Improvement, Participation, and Internalization," filed Mar. 1, 2011, now U.S. Pat. No. 8,055,577, which is in turn a continuation of application Ser. No. 12/062,348, entitled "Method and Apparatus for Stock and Index Option Price Improvement, Participation, and Internalization," filed Apr. 3, 2008, now U.S. Pat. No. 7,912,779, which is in turn a continuation of application Ser. No. 10/786,196, entitled "Method and Apparatus for Stock and Index Option Price Improvement, Participation, And Internalization," filed Feb. 25, 2004, now U.S. Pat. No. 7,392,218, which is in turn a continuation of application Ser. No. 09/621,769, entitled "Method and Apparatus for Stock and Index Option Price Improvement, Participation and Internalization," filed on Jul. 21, 2000, now U.S. Pat. No. 6,829,589, all of which are hereby expressly incorporated by reference in their entireties, including the specifications, claims, drawings, and abstracts.

BACKGROUND OF THE INVENTION

The present invention relates to securities trading. In particular, the present invention relates to a method for trading stock options that provides an intermediary with copies of option orders destined for a market.

An option (either stock or index) provides a contractual agreement that allows the holder to buy or sell a security or its underlying cash equivalent at a designated price for a specified period of time, unaffected by movements in the security market price during that period. Put and call options, purchased both for speculative and hedging reasons, are typically made in anticipation of changes in underlying prices. A put option provides the holder an option to sell, or put, shares to the other option party at a fixed put price even though the market price for the security declines. On the other hand, a call, provides the holder an option to buy, or call for, shares at a fixed call price notwithstanding a rise in the market price for the security.

In the past, order flow providers (OFPs) generated option orders to buy or sell put and call options. In particular, the OFP accepted a customer order (e.g., a buy put order), encoded the order, and transmitted the order directly to a market. The market (e.g., the Chicago Board of Options Exchange or CBOE), received the order and presented it to traders that determined whether to fill the order in part, in full, or not at all (i.e., an out) in a process often referred to as matching. The result of the matching process is then communicated back to the OFP that subsequently alerts the customer.

The order flow processing described above, however, only provides an effective mechanism for the market itself to trade options. In other words, past order flow processing was a closed system. As a result, other individuals and organizations that could also meaningfully participate in option trading and possibly improve the customer price were excluded from the opportunity to do so.

A need has long existed in the industry for a method for trading options that addresses the problems noted above and others previously experienced.

BRIEF SUMMARY OF THE INVENTION

A preferred embodiment of the present invention provides a method for stock and index option trading. The method includes the steps of receiving an option order, a copy of an option order, or option order information sufficient to ascertain the type of order and an associated contract (collectively referred to below as an "option order copy"), from an order flow provider. The option order is contemporaneously submitted to a market. The option order copy identifies, as examples, puts, calls, contract elements including a contract identifier, an underlying security, strike price, expiry, and option quantity. The method then determines a potential cross quantity and potential cross price based on the option order and submits to a market a contra-order (with respect to the originally received option order) specifying the contract (including the underlying security and expiry), as well as a potential cross quantity, and a potential cross price.

The option orders may be any of buy calls, sell calls, buy puts, and sell puts, as examples. Thus, when the option order is a buy call, the contra-order will be a sell call, when the option order is a sell call, the contra-order will be a buy call. Similarly, when the option order is a buy put, the contra-order will be a sell put, when the option order is a sell put, the contra-order will be a buy put.

The method may also, for example, translate the option order from any number of order flow provider formats into a common internal trading system format. Similarly, the contra-order may be formatted for any predetermined destination market, including the CBOE, PCOAST, AMEX, PHLX, or ISE.

In certain embodiments, the method may automatically determine the potential cross quantity and potential cross price and submit the contra-order without human intervention. In other embodiments, the method may popup a display that shows the contract elements, option bid price or option ask price, market bid and ask prices for the underlying security, risk management information, and the like, at a trader terminal, and monitor the trader terminal for a submit indicator (e.g., a click on a Submit button). In addition, the method may filter option orders before automatically submitting the contra-order, or before presenting option order related information on the trader terminal.

BRIEF DESCRIPTION OF SEVERAL VIEWS OF THE DRAWINGS

FIG. 2 shows an exemplary option pop-up window.
FIG. 3 illustrates a data flow diagram for an EDrop server.
FIG. 4 shows a method for option trading.

DETAILED DESCRIPTION OF THE INVENTION

Figure 1:
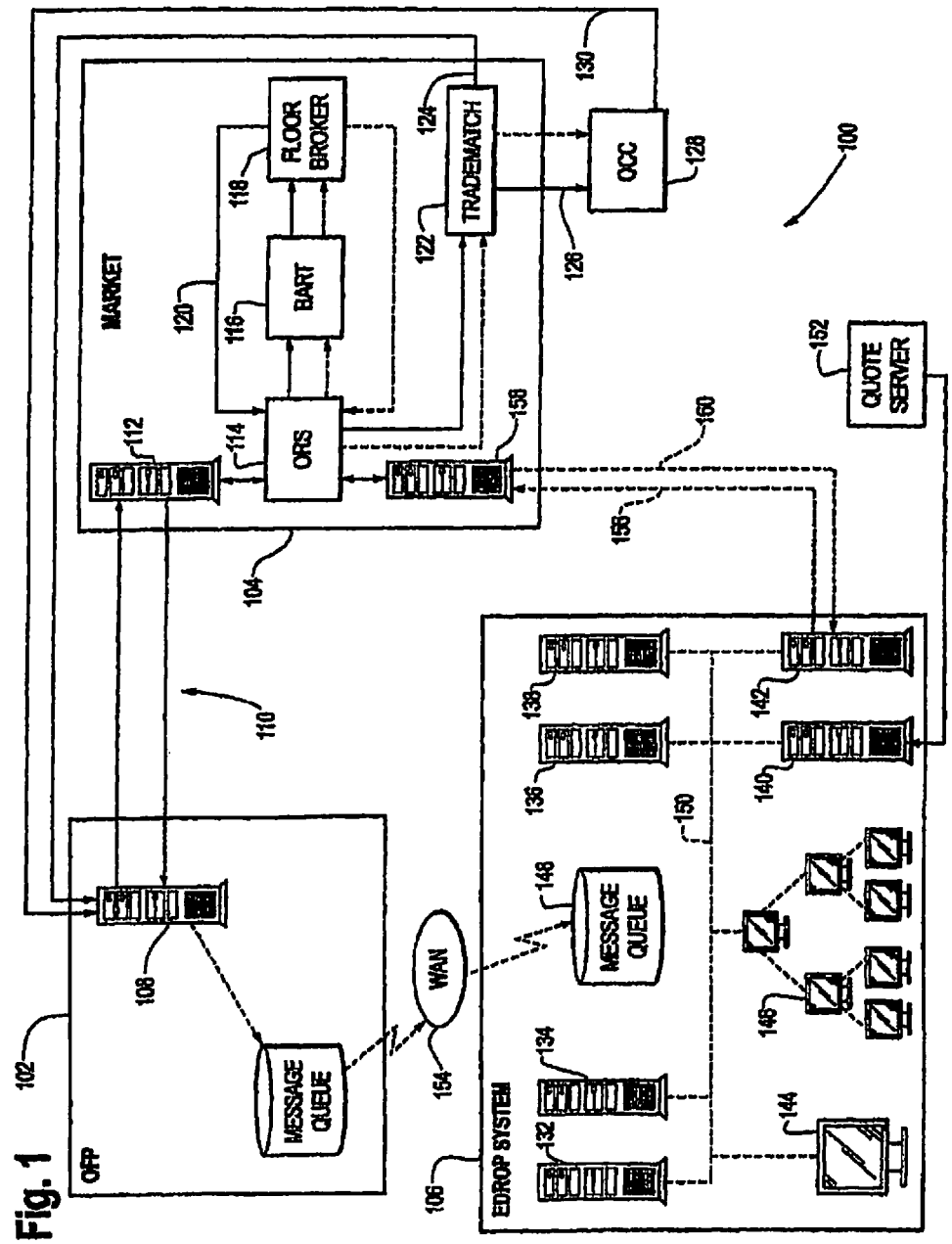
FIG. 1 illustrates an option trading network.

Turning now to FIG. 1, that figure presents a high level diagram of an options trading network 100. In FIG. 1, solid arrows represent conventional order flow processing, while dotted arrows show extended order flow processing as described in more detail below. The network 100 includes an order flow provider (OFP) 102, a market 104, and an electronic drop (EDrop) system 106. At the OFP 102, a mainframe 108 generates option orders that are transmitted over a network 110 to a server 112 at the market. The particular market structure discussed below is that of the Chicago Board of Options Exchange (CBOE), but it is noted that the present trading method may cooperate with any option market.

The server 112 provides the option orders to an order routing system 114 that forwards option orders to the BART 116. The BART (Booth Automated Routing Terminal) 116 is an exchange provided system that allows the OFP's staff to intercept an order for routing purposes. Orders routed through BART are eligible for packet restructuring. This allows for firm responsible for the BART terminal to specify which information is passed onto the PARS Terminal. The PARS terminal is the destination of all BART orders and is held by a broker in the trading pit, Once an order is routed to PARS from BART the order will then be executed. A BART terminal can handle limitless numbers of PARS stations giving the firm the ability to route its orders very definitively. One or more floor brokers 118 decide whether to fill, partially fill, or take no action on an option order. Resultant order acknowledgements are communicated back to the order routing system 114 over the link 120. The order acknowledgements pass through the trade-match module 122 where initial clearing functions begin. A report of unmatched trades (i.e., outs) are communicated back to the OFP 102 via the link 124, while matched (i.e., partial or complete fills) are communicated over link 126 to the OCC 128. The OCC (Options Clearing Corporation) 128 processes the pre-matched trades for final clearing and settlement, and communicates a report of matched trades back to the OFP 102 through the link 130. Each of the links 124-130 may represent a single connection through a network, or physically separate connections.

With the addition of the EDrop system 106, access to the market 104 is expanded. The EDrop system 106 includes, for example, an application server 132 (that stores executable applications), an e-mail server 134 (responsible for sending and receiving e-mail), and a message queue (MQ) server 136. The e-mail server 134 is not a required part of the EDrop process. In addition, the EDrop system 106 also includes a risk management server 138 (that executes risk management software), a quote server 140 (that receives real time quotes from an external source), and a gateway 142 (that communicates with the market 104).

Also illustrated as part of the EDrop system 106 is a trader terminal 144, a risk management system 146, and a option order message queue 148. An internal network, illustrated as an Ethernet network 150, connects the servers 132-142, trader terminal 144, and risk management system 146. The external real time quote server 152 provides real time security quotes and other statistics to the quote server 140.

The EDrop system 106 is connected to the OFP 102 through the WAN 154 (although the EDrop system 106, OFP 102, and market 104 may all be connected on a single network). As the OFP 102 generates an option order for the market 104, the OFP 102 contemporaneously generates a copy of the option order and transmits the copy to the EDrop system 106. The EDrop system 106 thereby receives the option order at the same time, or within milliseconds after the market 104.

The option order copies are queued in the order message queue 148. The queue server 136 monitors the queue for new option orders, retrieves the option orders, and presents the option orders on the trader terminal 144. To this end, the queue server 136 (or software running on the trader terminal 144) may identify in the option order option contract elements including underlying security, option quantity, expiry, strike price, and a contract identifier (e.g., an alphanumeric string).

As will be explained in more detail below, the trader operating the trader terminal 144 may then determine a potential cross quantity and a potential cross price based on the option order. Subsequently, the EDrop system 106 submits a contra-order, with respect to the option order, specifying contract elements including the contract identifier, underlying security, strike price, and expiry, as well as the potential cross quantity and the potential cross price, to the market 104 for fulfillment.

Turning briefly to FIG. 2, that figure illustrates an embodiment of a pop-up 200 displayed on the trader terminal 144. The pop-up 200 presents, for the option order, the current market bid 202 and ask 204 at the market 104 (as well as additional markets). The pop-up 200 also provides trader ask 206, trader bid 208, and trader quantity entries 210, a refresh button 212 (for updating the current bid and ask prices), a submit button 214, and a Cancel button. Pressing the submit button provides a submit indicator to the EDrop system 106 that the trader desires to send a contra-order to the market 104. The EDrop system 106 prepares the contra-order, using the trader bid or ask price, and the trader quantity as specified in the pop-up 200.

Additionally shown in the pop-up 200 are risk management entries 216 Delta, Gamma, Vega, Theta, and Rho for WJNAS (the contract symbol for this example), the trader current position, and the trader new position. The risk management entries represent trading parameters, boundaries or references and provide trading guidelines to the trader. The pop-up includes other information as well, including indicators for An Immediate or Cancel (i.e., an order is filled immediately at said price and quantity at the moment upon presentation or cancelled), Day (i.e., Day Orders are good at said quantity and price for the entirety of the trading day in which it was entered into the market), MKT (i.e., a Market Order to be traded at the quantity specified and the current price available at the market), NH (Price Not Held, i.e., an order at the specified quantity but not held to the specified price, E-size (the quantity of the order received from the OFP 102), Average values for implied volatilities, are captured in FIG. 2 for WJNAS at a moment in time at the values 31.836, 31.25, 32.81, 97.4375, and 97.5.

Returning to FIG. 1, the EDrop system 106 uses the link 156 through the gateway 142 to the EDrop order server 158 in the market 104 to communicate contra-orders, while the link 160 may be used to communicate resultant execution messages back to the EDrop system 106. The results of contra-order processing at the market 104 are also passed through the trademarch module 122 and OCC module 128 for reporting to the OFP 102.

It is also noted that the potential cross quantity, potential cross price, and the decision to submit a contra-order may be automated. In other words, in certain embodiments, the EDrop system 106 makes contra-order decisions automatically for every option order, or a subset of option orders based on, for example, risk management criteria. The remaining option orders may then be presented on the trader terminal 144.

Take for example, an IBM option order specifying a purchase of 50 calls of IBM. The OFP 102 submits the IBM option order to the market 104, but also contemporaneously submits an option order to the EDrop server 106. As the IBM option order makes its way to, and enters the market 104, the EDrop system 106 presents the IBM option order (and additional information as noted above with respect to FIG. 2) on the trader terminal 144. A trader may then determine whether to meet the order in whole or in part (or not at all).

For example, the trader may attempt to meet 15 of the 50 calls. The EDrop system 106, in response, submits a contra-order, with respect to the original order, to the market 104. In other words, the EDrop system 106 sends an option order to sell 15 calls of IBM. At the market 104, the contra-order and the original order may cross, resulting in 15 of the 50 purchase calls of IBM filled by the EDrop system 106 through the supporting infrastructure of the market 104.

Although FIG. 1 illustrates a single OFP 102, market 104, and EDrop system 106, there may be multiple OFPs, markets, and EDrop systems interconnected. Preferably, an EDrop system converts option orders (and other messages) sent from each OFP into an internal standard format for processing. Outgoing messages (including contra-orders) are translated into a format compatible with their destination (e.g., the market 104).

Turning next to FIG. 3, that figure presents a data flow diagram representative of the processing that occurs in the EDrop system 106. The OFP 302 sends option order copies (and possibly additional messages) to the EDrop system 304. The EDrop server 304 preferably converts the OFP 302 option order copy format into an internal trading system format. The same internal trading system format is preferably used for each OFP that may be connected to the EDrop server 304. For example, the OFP 302 may send an option order copy reciting the feedcode MSQVA. The feedcode is then interpreted according to the standard specified by the OCC (Options Clearing Corporation) as an October 105 put for Microsoft (MSFT). The quantity may be obtained from a subsequent line in the option order copy.

The fields provided in the internal trading system format are illustrated below in Table 1. The field values may be stored in individual variables, or collected into one or more data structures.

TABLE 1

| A. Message Header | B. Trade Destination | C. Transaction Number | D. Trade Status |
|---|---|---|---|
| E. Date of Trade | F. Time of Trade | G. Confirmation time of Order | H. Execution Firm |
| I. Execution Broker | J. Flags | K. Symbol | L. Exchange Code |
| M. Expiration Date | N. Strike Price | O. Price | P. Quantity |
| Q. Open Quantity | R. Minimum Quantity | S. Timed Order | T. Good until code |
| U. Good until | V. Stop limit price | W. Stopped price | X. With discretion fraction |
| Y. Commission rate | Z. Account | AA. Sub account | BB. Clearing firm |
| CC. Routing code | DD. Specialist | EE. Booth ID | FF. User Data |
| GG. User comment | HH. Reserved space | | |

The format of an option order varies from OFP to OFP. For example, the OFP 102 may use the fields shown below in Table 2.

TABLE 2

| 1. Buy/Sell | 2. Call/Put | 3. Quantity | 4. Symbol |
|---|---|---|---|
| 5. Month | 6. Strike | 7. Price Type | 8. Execution Type |
| 9. Firm Order Type | 10. Price | 11. Routing ID | 12. Accounting ID |
| 13. Sequence Number | 14. Exchange | 15. Filler | |

An exemplary conversion of the fields shown in Table 2 to the fields of the internal trading system format shown in Table 1 is:

| Field to Field |
|---|
| 1 to J |
| 1 to J |
| 3 to P |
| 4 to K |
| 5 to M |
| 6 to N |
| 7 to J or S-X (depending on Price Type) |
| 8 to J |
| 9 to J |
| 10 to V |
| 14 to B and/or CC |

All other inbound fields may be ignored and stored in a database. Note that the internal trading system format includes many fields that are not necessarily specified in a given OFP option order format. The fields are provided, however, so that the fields in more complex option orders received from other OFPs may be maintained and manipulated in the EDrop system 106.

The EDrop server 304 performs a first filtering operation 306 of the messages. The first filtering operation 306 allows for an immediate cut in the number of orders viewed by client processes. The filters include:
Size (the size of the order being traded),
Order Type (Type of execution or pricing style to be applied to the order at the floor.),
Route (forwarded to client services based on Route specified, i.e., the exchange to which the order is to be traded).

Additional filters include: Underlying Symbol, Industry Sector, Beta values and OFP disseminated criteria. An example implementation of a filter check on size is: If then contract specifies an order size less that the Auto-Ex (exchange automatically executed) size then filter the order (i.e., do not present the order to the client process described below).

Examples of execution types include Combination or Spread orders, GTC (Good till canceled), Day (Day orders), IOC (Immediate or cancel), or AON (All or none). Examples of pricing styles include Market (Market price), Limit (Limit to customer price), and NH (Not held to specified price).

All messages received pass through the text dump process 308 and are stored in the unfiltered database 310. Messages that pass through the first filter process 306 are stored, using an SQL database process 312 into a filtered database 314. Thus, the filtered database 314 preferably maintains messages that are eligible orders, in the sense the orders have passed an initial level of review and may result in a contra-order as explained below.

Continuing with respect to FIG. 3, the messages that pass the first filter process 306 continue through a second filter process 316. As examples, the second filter process 316 may provide client level filtering to reduce the number of orders viewed by the end-user by removing orders that meet a certain set of user-definable criteria.

The criteria may include, as examples:
Marketability (i.e., how valued is the order compared to the pricing available at the market),
Delta Risk (i.e., the directional risk in the order),
Position Risk (i.e., the manner in which the order being viewed will affect the current position at a strike level, month level, and global position management level).

As an example, a filter check for marketability may be implemented by determining the current NBBO (National Best Bid/Offer) and sending only orders that are near or inside these parameters.

Additional filter criteria include: Theta, Vega, and Gamma filters, as well as Volatility Filters, and Corporate Action filters. A customizable set of Price versus Edge filters are available for advanced filtering, in addition to Profit and Loss and Unit filters that refresh based on current position changes. To that end, an API to which additional filters can be added is optionally provided. The API provides function calls to change the filters when the market conditions or position strategies merit those changes.

Messages (typically option orders) that pass through the second filter process 316 are presented to the EDrop Client 318. The EDrop client 318 presents the option order copy information (and additional information shown in FIG. 2, for example), on a trader terminal. Alternatively, the EDrop client 318 may make an automated decision of potential cross quantity and potential cross price, and automatically submit a contra-order to the market 104.

Contra-orders that are sent to the market 104 are preferably stored in an Order Table 322 in a database. After acknowledgement of a partial or full fill, the EDrop client 318 may then store the associated fill information in the Fill Table 324 in the database. A further Trade Table is also provided for stocks, bonds, and other security trades that do not arise from option order placement and acknowledgement.

With reference next to FIG. 4, that figure shows a flow diagram 400 of a method for option trading implemented in software in the EDrop system 106. The EDrop system receives 402 an option order copy from an OFP, and translating 404 the option order copy into an internal trading system format.

Next, the EDrop system 106 identifies 406 contract elements in the option order copy. The contract elements may include, for example, a contract identifier, underlying security, strike price, option quantity, and expiry. As noted above, the EDrop system 106 may then filter 408 the option order copy and display 410 decision-making information on a trader terminal. The decision making information includes, for example, the contract elements identified above, as well as underlying security bid and ask prices (possible at many different markets), option bid or ask price, risk management variables, and the like.

The trader then determines 412 a potential cross quantity and price, while the EDrop system 106 monitors 414 for a submit indicator (e.g., the click of the Submit button 214). Subsequently, the EDrop system 106 obtains the potential cross quantity and price from the trader terminal, and submits 416 a contra-order, with respect to the original option order, to the market. The contra-order includes, for example, the contract elements including a contract identifier, underlying security, strike price, expiry date, potential cross quantity, and potential cross price. Next, the EDrop system 418 receives order fulfillment messages from the market 104 or OFP 102. The fulfillment messages may include, for example, full fills, partial fills, or outs, and are typically stored in a database at the EDrop system 106 for tracking and reporting purposes.

As noted above, the EDrop system 106 may instead automatically determine 420 a potential cross quantity and potential cross price. To that end, the EDrop system may examine risk management criteria, such as those set forth above. As an example, if the presented order information from the OFP points to an increase in volatility exposure for the trading position, a reduced amount of the order may be acted upon. The EDrop system 106 may then automatically determine a potential cross quantity of a reduced size and a potential cross price of that equal to the NBBO (i.e., the National Best Bid Offer).

While the invention has been described with reference to a preferred embodiment, it will be understood by those skilled in the art that various changes may be made and equivalents may be substituted without departing from the scope of the invention. In addition, many modifications may be made to adapt a particular step, structure, or material to the teachings of the invention without departing from its scope. Therefore, it is intended that the invention not be limited to the particular embodiment disclosed, but that the invention will include all embodiments falling within the scope of the appended claims.

The invention claimed is:

1. A method for stock option trading comprising:
receiving an option order at a server;
contemporaneously receiving the option order at an electronic drop (EDrop) system; and
using the EDrop system to automatically generate a match with respect to the option order, wherein the match specifies at least one of an underlying security, potential cross quantity, and the potential cross price.

2. The method of claim 1, wherein the contemporaneously receiving comprises receiving an option order selected from the group of option orders consisting of buy calls, sell calls, buy puts, and sell puts.

3. The method of claim 1, wherein the automatically generating comprises automatically generating a sell call when the option order is a buy call option order, and automatically generating a buy call when the option order is a sell call option order.

4. The method of claim 1, wherein the automatically generating comprises automatically generating a sell put when the option order is a buy put option order, and automatically generating a buy put when the option order is a sell put option order.

5. The method of claim 1, further comprising:
displaying at least an underlying security, an option quantity, at least one of an option bid price and option ask price, and an ask price at a trader terminal; and
monitoring the trader terminal for a submit indicator.

6. The method of claim 5, wherein the displaying further comprises displaying underlying security bid and ask prices at the server.

7. The method of claim 5, wherein the displaying further comprises displaying risk management variables.

8. The method of claim 1, wherein the EDrop system is remotely located from the server.

9. The method of claim 1, wherein the server is at a market.

10. The method of claim 1, further comprising:
generating the option order at an order flow provider; and
transmitting the option order over a network to the server.

11. The method of claim 1, further comprising providing the option order from the server to an order routing system.

12. The method of claim 11, further comprising forwarding the option order from the order routing system to a booth automated routing terminal (BART).

13. The method of claim 12, further comprising passing the option order from the BART to a PARS terminal.

14. The method of claim 13, further comprising communicating an acknowledgement regarding the option order back to the order routing system.

15. The method of claim 14, wherein the acknowledgement passes through a trade-match module for initial clearing.

16. The method of claim 1, further comprising communicating the match to an options clearing entity via an electronic link.

17. The method of claim 1, further comprising displaying information regarding the option order on a display.

18. The method of claim 17, wherein the displaying comprises displaying one or more of a current market bid at the market, current market ask at the market, trader ask, trader bid, and/or a trader quantity.

19. The method of claim 17, wherein the displaying comprises displaying risk management entries for the option order.

20. The method of claim 1, wherein the automatically generating the match is based on risk management criteria.

21. The method of claim 1, further comprising using the EDrop system to convert the option order into an internal trading system format.

22. The method of claim 21, wherein the using the EDrop system to convert the option order into the internal trading system format comprises filtering the option order by one or more of size, order type, route, underlying symbol, industry sector, Beta value, and/or order flow provider disseminated criteria.

23. The method of claim 22, further comprising further filtering the option order by user-definable criteria including one or more of marketability, Delta risk, position risk, a Theta filter, a Vega filter, a Gamma filter, a volatility filter, and/or a corporate action filter.

24. A method of trading in a securities trading network having a market, the method comprising:
receiving an order sent to a market at a first server;
using the first server to automatically obtain a contra-order based on the order; and
submitting a match of the order and contra-order to a second server.

25. The method of claim 24, wherein the first server is separate and distinct from the market.

26. The method of claim 24, wherein the order is one of a stock and index option order.

27. The method of claim 24, wherein the receiving comprises receiving an order selected from a group of option orders consisting of buy calls, sell calls, buy puts, and sell puts.

28. The method of claim 24, wherein the submitting comprises submitting a sell call when the order is a buy call order, and submitting a buy call when the order is a sell call order.

29. The method of claim 24, wherein the submitting comprises submitting a sell put when the order is a buy put order, and submitting a buy put when the order is a sell put order.

30. The method of claim 24, wherein the market matches the order and contra-order before submitting the match to the second server.

31. The method of claim 30, wherein the second server is at an exchange.

32. The method of claim 24, further comprising:
generating the order at an order flow provider; and
transmitting the order over a network to the market and the first server.

33. The method of claim 24, further comprising providing the order to an order routing system within the market.

34. The method of claim 33, further comprising forwarding the order from the order routing system to a booth automated routing terminal (BART).

35. The method of claim 34, further comprising passing the order from the BART to a PARS terminal.

36. The method of claim 35, further comprising communicating an acknowledgement regarding the order back to the order routing system.

37. The method of claim 36, wherein the acknowledgement passes through a trade-match module for initial clearing.

38. The method of claim 24, further comprising communicating the contra-order to an options clearing entity via an electronic link.

39. The method of claim 24, wherein the order is received at the market and the first server at the same time.

40. The method of claim 24, further comprising displaying information regarding the order on a display connected to one or both of market or the first server.

41. The method of claim 40, wherein the displaying comprises displaying one or more of a current market bid at the market, current market ask at the market, trader ask, trader bid, and/or a trader quantity.

42. The method of claim 40, wherein the displaying comprises displaying risk management entries for the order.

43. The method of claim 24, wherein the automatically obtaining the contra-order is based on risk management criteria.

44. The method of claim 24, further comprising converting one or both of the order or the contra-order into an internal trading system format at the first server.

45. The method of claim 44, wherein the converting comprises filtering one or both of the order or the contra-order by one or more of size, order type, route, underlying symbol, industry sector, Beta value, and/or order flow provider disseminated criteria.

46. The method of claim 45, further comprising further filtering one or both of the order or the contra-order by user-definable criteria including one or more of marketability, Delta risk, position risk, a Theta filter, a Vega filter, a Gamma filter, a volatility filter, and/or a corporate action filter.

47. A trading network system, comprising:
a market in communication with an electronic order flow provider through a network, the market configured to receive an order from the electronic order flow provider; and
a server in communication with the market, the server contemporaneously receiving the order, and wherein the server obtains a contra-order based on the order.

48. The trading network system of claim 47, wherein the server is remote from the market.

49. The trading network system of claim 47, wherein the server is separate and distinct from the market.

50. The trading network system of claim 47, wherein the market matches the order and contra-order.

51. The trading network system of claim 47, further comprising an order flow provider in communication with the market and the server, wherein the order flow provider is configured to generate the order and transmit the order to the market and the server over the network.

52. The trading network system of claim 47, wherein the market includes an order routing system.

53. The trading network system of claim 52, wherein the market further includes a booth automated routing terminal (BART), wherein the order routing system is configured to forward the order to the BART.

54. The trading network system of claim 53, further comprising a PARS terminal, wherein the BART is configured to pass the order to the PARS terminal.

55. The trading network system of claim 54, wherein the market further includes a trade match module, wherein the trade match module is configured to receive an acknowledgement regarding the order.

56. The trading network system of claim 47, further comprising an options clearing entity, wherein the options clearing entity is configured to receive a match of the order and the contra-order.

57. The trading network system of claim 47, wherein the market and the server are configured to receive the order from the order flow provider at the same time.

58. The trading network system of claim 47, wherein the server automatically obtains the contra-order.

59. The trading network system of claim 47, further comprising a display in communication with the server.

60. The trading network system of claim 59, wherein the display is configured to display one or more of a current market bid at the market, current market ask at the market, trader ask, trader bid, and/or a trader quantity.

61. The trading network system of claim 59, wherein the display is configured to display risk management entries for the order.

62. The trading network system of claim 59, wherein the server obtains the contra-order based, at least in part, on risk management criteria.

63. The trading network system of claim 47, wherein the server is further configured to convert the order into an internal trading system format.

64. The trading network system of claim 63, wherein the server is configured to filter the order by one or more of size, order type, route, underlying symbol, industry sector, Beta value, and/or order flow provider disseminated criteria.

65. The trading network system of claim 63, wherein the server is configured to filter the order by user-definable criteria including one or more of marketability, Delta risk, position risk, a Theta filter, a Vega filter, a Gamma filter, a volatility filter, and/or a corporate action filter.

66. A method for stock option trading comprising:
generating an option order at an order flow provider;
transmitting the option order over a network to a first server within a market;
receiving the option order at the first server within the market;
contemporaneously receiving the option order at a second server; and
automatically generating, at the second server, a match with respect to the option order, wherein the match specifies at least one of an underlying security, potential cross quantity, and the potential cross price.

67. The method of claim 66, further comprising providing the option order from the server to an order routing system.

68. The method of claim 67, further comprising forwarding the option order from the order routing system to a booth automated routing terminal (BART).

69. The method of claim 68, further comprising passing the option order from the BART to a PARS terminal.

70. The method of claim 69, further comprising communicating an acknowledgement regarding the option order back to the order routing system.

71. The method of claim 70, wherein the acknowledgement passes through a trade-match module for initial clearing.

72. The method of claim 66, further comprising communicating the match to an options clearing entity via the network.

73. The method of claim 66, further comprising displaying information regarding the option order on a display.

74. The method of claim 73, wherein the displaying comprises displaying one or more of a current market bid at the market, current market ask at the market, trader ask, trader bid, and/or a trader quantity.

75. The method of claim 73, wherein the displaying comprises displaying risk management entries for the option order.

76. The method of claim 66, wherein the automatically generating the match is based on risk management criteria.

77. The method of claim 66, further comprising using the second server to convert the option order into an internal trading system format.

78. The method of claim 77, wherein the using the second server to convert the option order into the internal trading system format comprises filtering the option order by one or more of size, order type, route, underlying symbol, industry sector, Beta value, and/or order flow provider disseminated criteria.

79. The method of claim 77, wherein the using the second server to convert the option order into the internal trading system format comprises filtering the option order by user-definable criteria including one or more of marketability, Delta risk, position risk, a Theta filter, a Vega filter, a Gamma filter, a volatility filter, and/or a corporate action filter.

80. The method of claim 66, wherein the second server is located at an electronic drop (EDrop) system.

81. The method of claim 66, wherein the second server is separate and distinct from the market.

82. A trading network system, comprising:
a market in communication with an electronic order flow provider through a network, the market comprising at least one market server configured to receive an option order from the electronic order flow provider; and
an electronic drop (EDrop) system comprising at least one EDrop server in communication with the market and the order flow provider, the at least one EDrop server configured to receive a copy of the option order from the electronic flow provider, and wherein the at least one EDrop server obtains a contra-order based on the option order.

83. The trading network system of claim 82, wherein the market further comprises:
an order routing system that receives the option order from the at least one market server; and
a booth automated routing terminal (BART) that receives the option order from the order routing system.

84. The trading network system of claim 83, further comprising a PARS terminal that receives the option order from the BART.

85. The trading network system of claim 83, wherein the market further comprises a trade-match module configured to receive an acknowledgment of the option order.

86. The trading network system of claim 82, further comprising an options clearing entity configured to report a match of the option order and the contra-order to the order flow provider.

87. The trading network system of claim 82, wherein the at least one EDrop server comprises one or more of:
an application server configured to store executable applications;
a message queue server;
a risk management server configured to execute risk management software; and/or
a quote server configured to receive real time quotes from an external source.

88. The trading network system of claim 82, wherein the EDrop system further comprises a trader terminal.

89. The trading network system of claim 88, wherein the trader terminal includes a display, wherein the display presents, for the option order, one or more of a current market bid, a current market ask, a trader ask, a trader bid, and/or a trader quantity.

90. The trading network system of claim 89, wherein the EDrop system obtains the contra-order using the trader ask or trader bid and the trader quantity.

91. The trading network of claim 89, wherein the display also presents risk management entries including one or more of Delta, Gamma, Vega, Theta, and Rho, the trader current position, and the trader new position.

92. The trading network system of claim 82, wherein the EDrop system automatically obtains the contra-order.

93. The trading network system of claim 92, wherein the EDrop system further comprises a risk management system, wherein the EDrop system automatically obtains the contra-order based on risk management criteria.

94. The trading network system of claim 82, further comprising a wide area network (WAN) that connects the EDrop system to the order flow provider.

95. The trading network system of claim 82, wherein one or both of the option order and the contra-order comprise identifiable contract elements including one or more of underlying security, option quantity, expiry, strike price and/or a contract identifier.

96. The trading network system of claim 82, wherein the at least one EDrop server is further configured to convert the option order into an internal trading system format.

97. The trading network system of claim 96, wherein the at least one EDrop server is configured to filter the option order by one or more of size, order type, route, underlying symbol, industry sector, Beta value, and/or order flow provider disseminated criteria.

98. The trading network system of claim 96, wherein the at least one EDrop server is configured to filter the option order by user-definable criteria including one or more of marketability, Delta risk, position risk, a Theta filter, a Vega filter, a Gamma filter, a volatility filter, and/or a corporate action filter.

99. The trading network system of claim 82, wherein the at least one EDrop server is configured to receive the copy of the option order from the electronic flow provider when the market receives the option order.

100. The trading network system of claim 82, wherein the EDrop system is remote from the market.

101. The trading network system of claim 82, wherein the EDrop system is separate and distinct from the market.

102. The trading network system of claim 82, wherein the market matches the order and contra-order.

103. A method of trading in an options trading network having a market, the method comprising:
electronically receiving an option order sent to a market at a first server;
using the first server to automatically obtain a contra-order based on the option order; and
electronically receiving a match of the option order and the contra-order at a second server.

104. The method of claim 103, wherein the market matches the option order and contra-order before submitting the match to the second server.

105. The method of claim 103, further comprising:
generating the option order at an order flow provider; and
transmitting the option order over a network to the market and the first server.

106. The method of claim 103, wherein the option order is received at the market and the first server at the same time.

107. The method of claim 103, further comprising providing the option order to an order routing system within the market.

108. The method of claim 107, further comprising forwarding the option order from the order routing system to a booth automated routing terminal (BART).

109. The method of claim 108, further comprising passing the option order from the BART to a PARS terminal.

110. The method of claim 109, further comprising communicating an acknowledgement regarding the option order back to the order routing system.

111. The method of claim 110, wherein the acknowledgement passes through a trade-match module for initial clearing.

112. The method of claim 103, further comprising communicating the contra-order to an options clearing entity via an electronic link.

113. The method of claim 103, wherein the option order is received at the market and the first server at the same time.

114. The method of claim 103, further comprising displaying information regarding the option order on a display connected to one or both of market or the first server.

115. The method of claim 114, wherein the displaying comprises displaying one or more of a current market bid at the market, current market ask at the market, trader ask, trader bid, and/or a trader quantity.

116. The method of claim 114, wherein the displaying comprises displaying risk management entries for the option order.

117. The method of claim 103, wherein the automatically obtaining the contra-order is based on risk management criteria.

118. The method of claim 103, further comprising converting one or both of the option order or the contra-order into an internal trading system format at the first server.

119. The method of claim 118, wherein the converting comprises filtering one or both of the option order or the contra-order by one or more of size, order type, route, underlying symbol, industry sector, Beta value, and/or order flow provider disseminated criteria.

120. The method of claim 119, further comprising further filtering one or both of the option order or the contra-order by user-definable criteria including one or more of marketability, Delta risk, position risk, a Theta filter, a Vega filter, a Gamma filter, a volatility filter, and/or a corporate action filter.

* * * * *